Feb. 17, 1931.  H. J. WALKER  1,792,786

SEALING MEANS

Filed Oct. 26, 1928

INVENTOR.
Harry J. Walker
BY
Francis D. Hardesty
ATTORNEY.

Patented Feb. 17, 1931

1,792,786

UNITED STATES PATENT OFFICE

HARRY J. WALKER, OF LORAIN, OHIO, ASSIGNOR TO THE LORAIN AUTOMATIC ICER COMPANY, OF LORAIN, OHIO, A CORPORATION OF OHIO

SEALING MEANS

Application filed October 26, 1928. Serial No. 315,315.

The present invention relates to improvements in compressors or devices of this character in which a rotating element passes through a wall having different gas pressure on the two sides of said wall and more particularly to means for sealing the opening through which said member passes.

Among the objects of the invention is a simple and effective sealing means for such devices which is easily constructed and installed.

Another object is sealing means of the type indicated which shall have less friction and which may be more effectively lubricated than the usual devices of this character.

Another object is a bearing and sealing joint in which a double convex ring has a spherical surface lapped to and with a spherical surface on another ring to form a lapped spherical bearing and sealing joint therebetween.

Still other objects will readily occur to those skilled in the art upon reference to the following description and the accompanying drawings in which Fig. 1 is a section through a compressor crank case embodying the invention.

Figure 1:
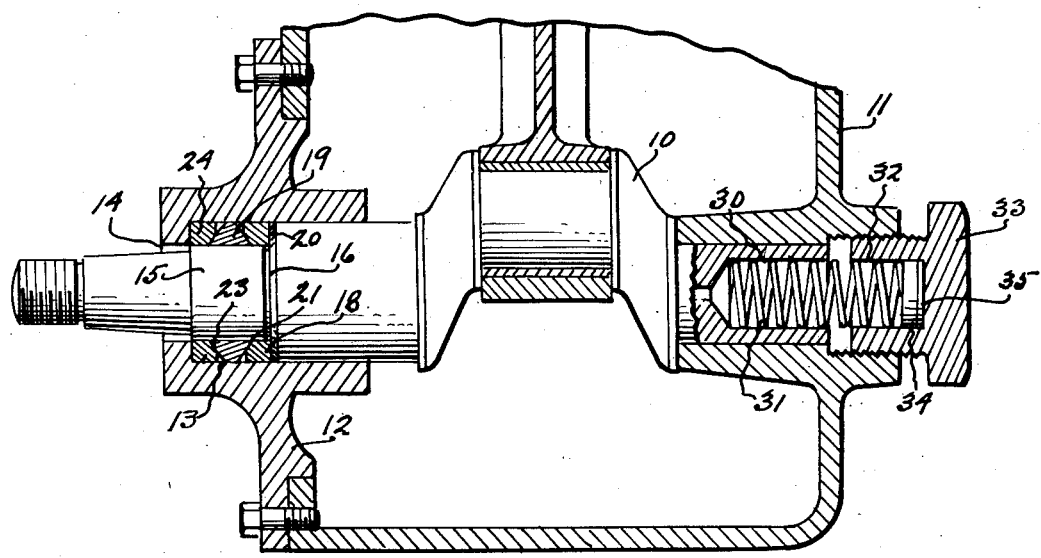
Figure 2:
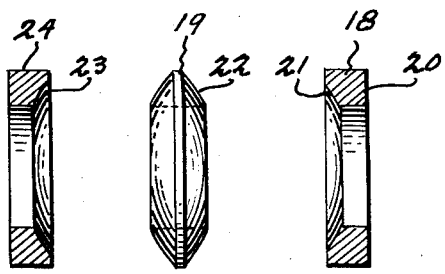
Fig. 2 is a detail showing the sealing rings.
Figure 3:
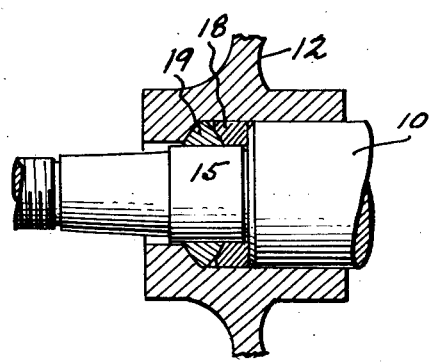
Fig. 3 is a sectional view of a modification.

In the drawings which illustrate the crank shaft and part of the crankcase of a compressor, the crank shaft is indicated at 10 with the rear wall of the crank case indicated at 11 and provided with an opening in the side opposite the wall 11, which opening will be closed by a removable plate 12 in the well known manner.

The plate 12 is provided with a recessed portion 13 having the recess of sufficient dimensions to receive and form a bearing for the shaft which latter passes therethrough and projects from the axial opening 14 through which passes the extreme end of the crank shaft 10.

As mentioned above, the crank shaft 10 has its one end provided with a reduced portion 15 at the inner end of which is a shoulder 16 and this reduced portion 15 is of somewhat smaller diameter than the recess 13 allowing space between the reduced portion and the walls of the recess. In this space are located a pair of rings 18 and 19. The ring 18 is provided with one flat surface 20 adapted to abut against the shoulder 16 on the crank shaft. Its opposite face 21 is provided with a spherical bearing and sealing surface adapted to cooperate with a similar surface 22 of the ring 19. Further ring 19 on its other side is provided with a second spherical bearing surface, which is lapped to and with a cooperating bearing surface 23 in the end of the recess 13. This surface may be integral with the plate 12 or provided upon a third ring 24 which shall be like ring 18 but reversed in position in order to cooperate with the ring 19.

These rings 18, 19 and 24 are preferably made of hardened steel and ground accurately to form, although other metals such as hard bronze have been used with good results. The rings are preferably of such dimensions as to fit loosely in the recess 13 and around the reduced portion 15 of the crank shaft. Further, ring 24 is of such a diameter externally as to be press fitted in the recess 13 to form an hermetic seal at this point.

When the rings are placed in the position and held comparatively tightly together, an effective seal is formed which prevents passage of gases from the interior of the crank case out around the shaft and the spherical surfaces permit considerable variation of alignment of the crank shaft and wall without breaking the seal.

In order to effectively hold the rings 18, 19 and 24 together and maintain the seal, it is preferred to provide means to exert a yielding pressure on the crank shaft 10, longitudinally and against the rings held in the plate 12. This is accomplished by providing the opposite end of the shaft with a recess 30 in which is seated a spring 31 whose opposite end is seated in a suitable recess 32 in the rear wall 11. For convenience this recess is preferably formed in a screw plug 33 and for the purpose of adjustment it is proposed to make the recess 32 somewhat deeper than necessary and place in its bottom a hardened plug 34 which plug may be made easily removable so that suitable shims 35 may be placed behind it and thus shorten the effective length of the spring and thereby increase its compressive force. Such an arrangement provides a firm but yielding pressure longitudinally of the shaft 10 so as to maintain the sealing rings in contact with each other and with the adjacent shoulder and thereby maintain the seal.

Now having described the invention and the preferred forms of embodiment thereof, it is to be understood that the said invention is to be limited not to the specific details herein set forth but only by the scope of the claims which follow.

I claim:—

1. In a bearing and seal construction for a rotating shaft wherein a lapped joint is desirable, bearing and sealing means including a ring permanently and hermetically secured to a shaft casing and having on one side a spherical surface, a second bearing ring having spherical surfaces, one of which is lapped to and with the spherical surface of the first mentioned ring to form a lapped, spherical bearing and sealing joint therebetween, and a third ring having a spherical face and a face having a floating contact with a portion fixed to said shaft, whereby the latter will hold the first mentioned rings in bearing and sealing contact.

2. In a bearing and seal construction for a rotating shaft wherein a lapped joint is desirable, bearing and sealing means including a ring permanently and hermetically secured to a shaft casing by a press fit and having on one side a spherical surface, a second bearing ring having spherical surfaces, one of which is lapped to and with the spherical surface of the first mentioned ring to form a lapped spherical bearing and sealing joint therebetween, and a third ring having a spherical face and a face having a floating contact with a portion fixed to said shaft, whereby the latter will hold the first mentioned rings in bearing and sealing contact.

HARRY J. WALKER.